United States Patent [19]

Kawamura et al.

[11] Patent Number: 4,585,311
[45] Date of Patent: Apr. 29, 1986

[54] LIQUID CRYSTAL DEVICE HAVING INTERDIGITATED ELECTRODES

[75] Inventors: Takao Kawamura; Akihiko Sugimura, both of Sakai, Japan

[73] Assignee: Kyocera Corporation, Japan

[21] Appl. No.: 455,932

[22] Filed: Jan. 6, 1983

[30] Foreign Application Priority Data

| Jan. 25, 1982 [JP] | Japan | 57-10356 |
| Jun. 17, 1982 [JP] | Japan | 57-105088 |
| Aug. 12, 1982 [JP] | Japan | 57-141550 |

[51] Int. Cl.$^4$ .............................................. G02F 1/13
[52] U.S. Cl. ............................... 350/347 V; 350/336; 350/337
[58] Field of Search ................. 350/336, 347 R, 347 V

[56] References Cited

U.S. PATENT DOCUMENTS 3,981,559  9/1976  Channin ........................... 350/336

OTHER PUBLICATIONS

Soref, R. A., "Field Effects in Liquid Crystals Obtained with Interdigital Electrodes," *Journal of Applied Physics*, vol. 45, No. 12 (Dec. 1974), pp. 5466–5468).

*Primary Examiner*—John K. Corbin
*Assistant Examiner*—Richard F. Gallivan
*Attorney, Agent, or Firm*—Spensley Horn Jubas & Lubitz

[57] ABSTRACT

This invention relates to a liquid crystal device applying an optoelectronic effect of liquid crystals.

This invention aims at the provision of a liquid crystal device which is so constructed that; a transparent substrate having interdigital electrodes and a transparent substrate having an opposite electrode are disposed close to each other between two polarizers whose polarization axes intersect at a right angle with each other, so that both the electrodes are opposed to each other; a liquid crystal cell charging therein liquid crystal is disposed between both the transparent substrates so that the interdigital electrodes are arranged in parallel to the polarization axis of either one of two polarizers; the interdigital electrodes comprise a grounding electrode having a plurality of interdigital portions and a drive electrode positioned therebetween and having a width the same as that of one dot forming the ON and OFF conditions of the transmission light; and the drive electrodes are provided in plural rows, thereby having an extremely high contrast ratio for the ON and OFF conditions of the transmission light and responding at extremely high speed.

8 Claims, 11 Drawing Figures

LIQUID CRYSTAL DEVICE HAVING INTERDIGITATED ELECTRODES

BACKGROUND OF THE INVENTION

This invention relates to an improvement in a liquid crystal device utilizing an electro-optic effect, and more particularly to a liquid crystal device utilizing the birefringence possessed by liquid crystal molecules, in other words, the characteristic that the refractive index of the light is different in the direction of the major axis and that perpendicular thereto at the liquid crystal molecules.

Recently, the liquid crystal device applying the electro-optic effect exhibited by the liquid crystal has been widely used as display devices for numeral display panels of wrist watches or electric calculators and also is expected to be developed in application to the field of electro-optic, for example, electro-optic shutters used in cameras or electro-optic scanners for printers, other than the display devices.

However, in a case that the electro-optic effect of conventional liquid crystal device is used to actuate, for example, the electro-optic shutter, the orientations of liquid crystal in two directions to form the ON or OFF condition of the transmission light are so different that one orientation is to apply the electric field between the opposite electrodes to thereby forcibly change the alignment of liquid crystal molecules existing between both the electrodes, while, the other depends only on molecule orientation on a basis of the initial alignment of the same. Hence, the response speed of liquid crystal is extremely slow as several tens to several hundreds msec and interception of the light is not complete, resulting in that such conventional liquid crystal device has been impossible to be put to practical use as the electro-optic shutter.

BRIEF DESCRIPTION OF THE PRIOR ART

Accordingly, a liquid crystal device has been proposed by Channin, which is of three electrode construction such that one of opposite electrodes at the cell is interdigital to thereby eliminate the defect in the response speed of the conventional liquid crystal device.

The liquid crystal device using a cell of three electrode construction utilizes retardation from the optical anisotropy of liquid crystal molecules is so constructed that a liquid crystal cell 1, as shown in FIGS. 1-(A) and 1-(B), is disposed between polarizers Po and An whose polarization axes intersect at a right angle with each other so that the lengthwise directions (the direction of axis Y) of interdigital electrodes $L_o$ and $L_2$ at the liquid crystal cell are inclined at angles of 45° with respect to the polarization axes of both the polarizers Po and An respectively. The liquid crystal molecules, when voltage Vc is applied between the opposite electrodes $L_o$ and $L_1$ at the liquid crystal cell 1, vertically orient (in the direction of the axis Z in FIG. 1-(B)) and the light passes directly through the liquid crystal cell to thereby be intercepted by the two polarizers Po and An whose polarization axes intersect perpendicularly to each other to result in the OFF condition of the light. On the other hand, the liquid crystal molecules, when voltage Vd is applied between the interdigital electrodes $L_o$ and $L_2$, orient in parallel (in the direction of the axis X in FIG. 1-(B)) and have the characteristic the same as that of uniaxial crystal of the optical axis in the direction of the axis X, the optical axis inclining at an angle of 45° to the two polarizers, whereby the light passes therethrough in the intensity given by the following equation, thus creating the ON condition for the light.

$$I = I_o \sin^2 2\phi \sin^2 (\delta/2)$$

where
- $I_o$: the intensity of the light after deducting a loss during the pass of the light through the polarizers Po and An
- $\phi$: an angle between the directions of polarization of the incident light and of the axis of liquid crystal molecule, as $\phi = 45°$, and
- $\delta$: a phase difference between the ordinary ray and the extraordinary ray in the liquid crystal cell.

Thus, voltages Vc and Vd to be applied are switched to control the ON or OFF condition of the light. The liquid crystal device using the cell of three electrode construction, whose liquid crystal orientations are forced to form the ON or OFF condition of the transmission light by applied voltages Vc and Vd, can obtain the high response speed such as several msec.

The liquid crystal device using the Channin's liquid crystal cell of three electrodes construction, however, has the liquid crystal cell whose each electrode has a fixed thickness so that the direction of applying the electric field for orientation of liquid crystal molecules is different at angle of about 99° in the upper portion and side portion of the electrode. Therefore, in a case of forming the OFF condition of the transmission light, the liquid crystal orients in the direction of the axis Z at the upper portion of electrode $L_o$ and in the direction of the axis X at the lateral side portion of the same, so that the optical axis becomes inclined at 45° from two polarizers under the optical characteristic the same as the uniaxial crystal having the optical axis in the direction of the axis X. Hence, the light of intensity given by the equation the same as when the aforesaid light-ON condition is formed, passes always through the lateral portion of electrode so as to form the light-ON condition, whereby such liquid crystal device is defective in that the complete OFF condition of the light, when viewed from the electrode as a whole, cannot be obtained.

SUMMARY OF THE INVENTION

The present invention has been designed to eliminate the above defect in the conventional liquid crystal device. An object of the invention is to provide a liquid crystal device which can respond at high speed, obtain the complete OFF condition of the transmission light, and have an extremely high contrast ratio in the ON and OFF conditions of the transmission light.

This invention is characterized in that between two polarizers whose polarization axes intersect at a right angle with each other, a transparent substrate having interdigital electrodes and that having an opposite electrode are disposed close to each other so that both the electrodes are opposite to each other, and a liquid crystal cell charging therein liquid crystal is disposed between both the transparent substrates in the relation that the interdigital electrodes is parallel to the polarization axis of either one of the two polarizers.

These and other objects of the invention will become more apparent in the following description and the drawings.

BRIEF DESCRIPTION OF THE DRAWING FIGURES

FIGS. 1-(A) and -(B) are structural views explanatory of a conventional liquid crystal device.

FIGS. 2-(A) and -(B) are structural views explanatory of a conventional liquid crystal device, FIGS. 2-(A) and -(B) are structural views explanatory of a first embodiment of a liquid crystal device of the invention, FIG. 3 is a plan view exemplary of interdigital electrodes in the FIG. 2 embodiment, FIGS. 4-(A) and -(B) are structural views explanatory of a second embodiment of the liquid crystal device of the invention, FIG. 5 is a plan view exemplary of interdigital electrodes in the FIG. 4 embodiment, FIGS. 6-(A) and -(B) are structural views explanatory of a third embodiment of the liquid crystal device of the invention, and FIG. 7 is a plan view exemplary of interdigital electrodes in the FIG. 6 embodiment.

DETAILED DESCRIPTION OF THE PREFERRED EMBODIMENTS

Figure 2A:
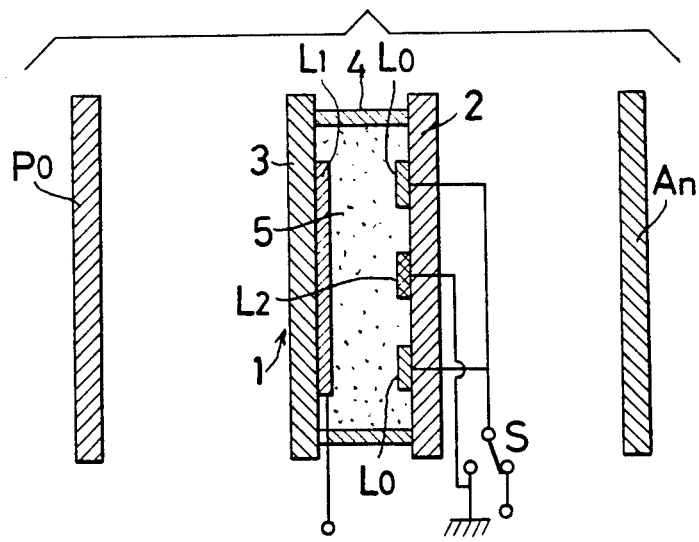
Figure 2B:
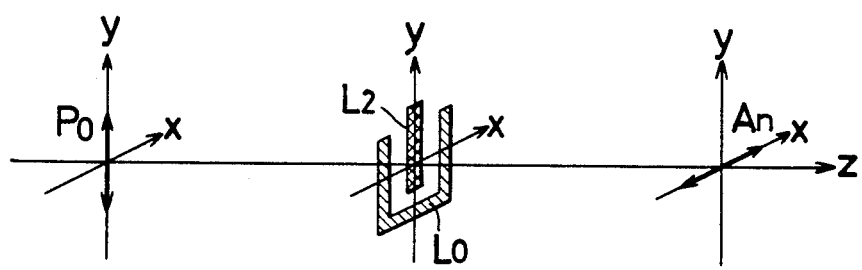

Referring to FIGS. 2-(A) and -(B), a basic construction of the first embodiment of the liquid crystal of the invention is shown, in which reference numeral 1 designates a liquid crystal cell, and Po and An designate polarizers.

The liquid crystal 1 comprises a transparent substrate 2 having at the inner surface thereof interdigital electrodes $L_o$ and $L_2$ and a transparent substrate 3 having at the inner surface an opposite electrode $L_1$, both the substrates 2 and 3 being disposed close to each other through spacers 4 so as to form the predetermined gap, into which liquid crystal 5 exhibiting the positive dielectric anisotropy is charged.

The inner surfaces of transparent substrates 2 and 3 are subjected to the molecular orientation treatment for facilitating the molecular orientation of the liquid crystal 5.

The interdigital electrodes $L_o$ and $L_2$ and opposite electrode $L_1$ are formed of transparent conductive materials, such as tin oxide or indium oxide and subjected to the conventionally well-known thin film coating and etching process.

Figure 3:
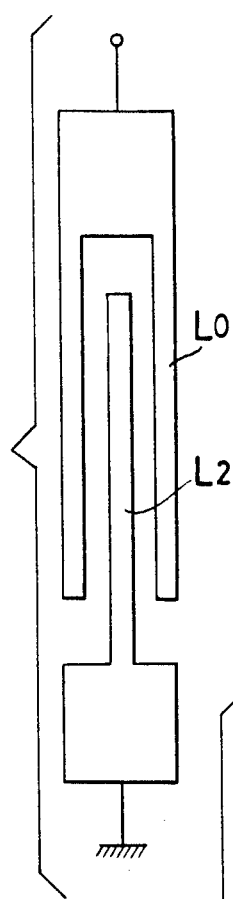

The interdigital electrodes, as shown in FIG. 3, comprise the recessed electrode $L_o$ and projecting electrode $L_2$ inserted thereinto, the projecting electrode $L_2$ being grounded as a common electrode, the recessed electrode $L_o$ being connected to an external power source (not shown), or to a ground terminal by switching a switch S, thereby serving as a drive electrode or a grounded electrode.

Also, the opposite electrode $L_1$ is connected to the external power source (not shown) and serves as a control electrode.

When the recessed electrode $L_o$ of the interdigital electrodes is connected to the ground terminal by the switch S, the interdigital electrodes $L_o$ and $L_2$ are all grounded and the control voltage Vc is applied between the interdigital electrodes $L_o$ and $L_2$ and the opposite electrode $L_1$, whereby the liquid crystal 5 is forced to vertically orient with respect to the substrates 2 and 3 thereof. Upon contact of recessed electrode $L_o$ with a drive power source, the drive voltage Vd is applied between the interdigital electrodes $L_o$ and $L_2$ and the control voltage Vc between the opposite electrode $L_1$ and the interdigital electrode $L_2$, whereby the liquid crystal 5 is oriented in the direction of composite electric field of both voltages, in other words, slantwise of the substrates 2 and 3 at the liquid crystal cell 1.

In addition, the number of pectinations of interdigital electrodes $L_o$ and $L_2$ is not defined to three as shown in FIG. 3, but desirably variable corresponding to the size of liquid crystal cell 1.

The polarizers Po and An are disposed in front of and behind the liquid crystal cell 1, in other words, at the light incident side and transmitting side respectively, the polarization axes of the same intersecting at a right angle with each other. Alternatively, the polarizer An instead of polarizer Po may be disposed to keep its polarization axis parallel to the interdigital electrodes at the liquid crystal cell 1.

Now, in the liquid crystal device of the invention, in front of polarizer Po is disposed a miniature lamp (not shown) having a luminous element of tungsten as a light source so that in a case of applying the control voltage Vc between the opposite electrode $L_1$ and the interdigital electrodes $L_o$ and $L_2$, liquid crystal molecules of liquid crystal 5 orient vertically (in the direction of axis Z in FIG. 2-(B)) with respect to the substrates at the liquid crystal cell 1 and the light polarized in the direction of axis Y by the polarizer Po having the polarization axis in the direction of Y, is not absorbed by the liquid crystal 5, but passes directly through the liquid crystal cell 1. The transmission light in the axis X through the liquid crystal cell 1 is absorbed completely by the polarizer An having the polarization axis in the direction of X axis and intercepted to form the OFF condition of the transmission light.

Incidentally, at this time, even when the liquid crystal positioned at the lateral side of electrode is oriented in the direction of the axis X because of a fixed width of each electrode at the liquid crystal cell 1, the orientation perpendicular to the polarization axis (in the direction of the axis Y) of polarizer Po allows the liquid crystal at the lateral side of electrode (the liquid crystal in the direction of Y axis) to completely absorb the transmission light in the direction of the axis Y through polarizer Po, thereby not allowing the light to pass the liquid crystal cell 1. As a result, the liquid crystal device of the invention forms a complete OFF condition of the transmission light also at the lateral side of electrode at the liquid crystal cell 1.

In a case of applying the drive voltage Vd between the interdigital electrodes $L_o$ and $L_2$ at the liquid crystal cell 1 and simultaneously the control voltage Vc between the opposite electrode $L_1$ and the interdigital electrode $L_2$, molecules of liquid crystal 5 orient slantwise (in the composite direction of the axes Z and X in FIG. 2-(B)) with respect to the substrates at the liquid crystal cell 1 so that the light polarized in the direction of the axis Y by the polarizer Po of the polarization axis in the Y axis direction is subjected to optical rotation in the direction of the axis X and passes the liquid crystal cell 1. The transmission light optical-rotated will pass directly the polarizer An of polarization axis in the X axis direction, thereby forming the ON condition of the transmission light, thus forming the ON and OFF conditions thereof.

Next, explanation will be given on the operating effect of the first embodiment of the invention on a basis of an example to be discussed below.

In the following example, the liquid crystal cell and polarizers are disposed as shown in FIG. 2 and the interdigital electrodes as shown in FIG. 3. A He-Ne laser ($\lambda = 6328$ Å) has been used as a light source and each liquid crystal cell has been applied with drive voltage Vd and control voltage Vc so that the response speed (the rise time and fall time) and a contrast ratio for the ON and OFF conditions of the transmission light, as the liquid crystal device, have been measured.

In addition, the rise time ($\tau$ write), fall time ($\tau$ erase) and contrast ratio, are prescribed by the following equations respectively:

$\tau$ write $= \tau$ delay $+ \tau$ rise, and $\tau$ erase $= \tau$ decay, where
- $\tau$ delay: the rise time for raising the intensity of the transmitted light from the minimum value to 10% of the maximum value of the intensity,
- $\tau$ rise: a time period for raising the intensity of the transmitted light from 10 to 90% of the maximum value, and
- $\tau$ decay: a time period for the intensity of the transmitted light which falls from 90 to 10% of the maximum value.

Contrast ratio $=$ T max./T min.

where
- T max.: the maximum value of the intensity of the transmitted light, and
- T min.: the minimum value of the same.

[Example 1]

In this example, the liquid crystal cell and polarizers have been formed of the following components and the response speed and contrast ratio, when applied with control voltage Vc of 35 V (r.m.s.) and drive voltage Vd or 35 V (r.m.s.), have been measured.
Liquid crystal cell comprising
liquid crystal in use: ZLI-1557 (manufactured by Merck & Co., Inc.),
transparent substrate: glass substrate,
electrode material: indium oxide, and
a gap between the transparent substrates (a thickness of liquid crystal layer): 12.5 μm, and Polarizer using HN-38 (Manufactured by Polaroid Corp.).

(Results of Measurement)

Response speed:
rise time ($\tau$ write) $= 0.5$ msec
fall time ($\tau$ decay) $= 0.6$ msec
Contrast ratio:
(T max./T min.) $= 120$

[Example 2]

A liquid crystal cell of a gap of 6.0 μm between the transparent substrates in Example 1 has been used and the control voltage Vc of 60 V (r.m.s.) and drive voltage Vd of 60 V (r.m.s.) have been applied to measure the response speed and contrast ratio as the same as Example 1.

(Results of Measurement)

Response speed:
rise time ($\tau$ write) $= 0.25$ msec
fall time ($\tau$ decay) $= 0.5$ msec.
Contrast ratio:

(T max./T min.) $= 470$

[Example 3]

A liquid crystal cell of a gap of 6.0 μm between the transparent substrates in Example 1 has been used and the control voltage Vc of 80 V (r.m.s.) and drive voltage Vd of 80 V (r.m.s.) have been applied so that the response speed and contrast ratio have been measured as the same as Example 1.

(Results of Measurement)

Response speed:
rise time ($\tau$ write) $= 0.15$ msec, and
fall time ($\tau$ decay) $= 0.25$ msec
Contrast ratio:

(T max./T min.) $= 930$

[Comparative Example]

Figure 1A:
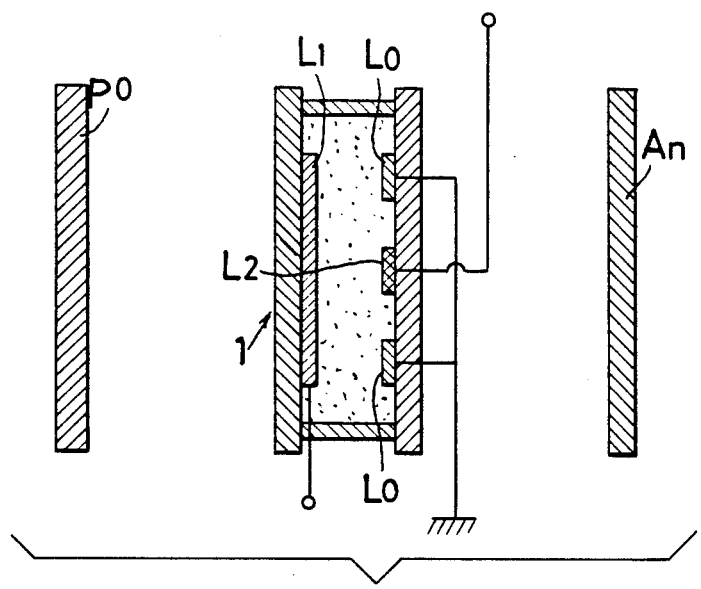
Figure 1B:
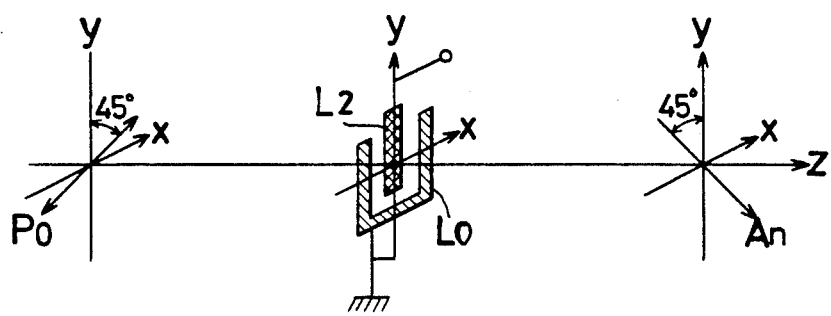

The liquid crystal cell and two polarizers in Example 1 have been disposed as shown in FIG. 1 and the control voltage Vc of 35 V (r.m.s.) and drive voltage Vd of 35 V (r.m.s.) have been applied so that the response speed and contrast ratio have been measured.

(Results of Measurement)

Response speed:
rise time ($\tau$ write) $= 1.5$ msec, and
fall time ($\tau$ decay) $= 0.35$ msec
Contrast ratio:

(T max./T min.) $= 7$

As seen from the above examples and results of measurement, the first embodiment of liquid crystal device of the invention disposes the liquid crystal cell between two polarizers whose polarization axes intersect perpendicularly to each other so that the interdigital electrodes are kept in parallel to one of the two polarizers, whereby the contrast ratio in the ON and OFF conditions of the transmission light is far improved and the response speed becomes extremely fast.

Figure 4A:
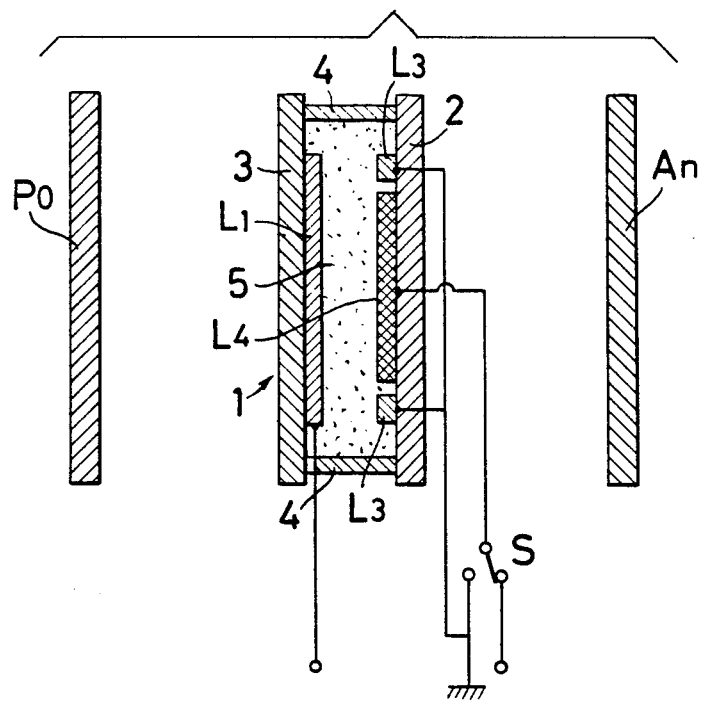

Next, a second embodiment of the liquid crystal device of the invention will be detailed in accordance with FIGS. 4-(A) and -(B) and 5.

In addition, the same parts as in the first embodiment are designated by the same reference numerals.

FIGS. 4-(A) and -(B) show the fundamental construction of the second embodiment, in which reference numeral 1 designates a liquid crystal cell, and Po and An designate polarizers.

The liquid crystal cell 1 comprise a transparent substrate 2 having at the inner periphery thereof interdigital electrodes $L_3$ and $L_4$ and a transparent substrate 3 having the inner periphery an opposite electrode $L_1$, both the substrates 2 and 3 being disposed close to each other through spacers 4 so that the predetermined gap is defined between the substrates, the gap charging therein liquid crystal 5 exhibiting the anisotropy.

The transparent substrates 2 and 3 are subjected at the inner surfaces to the molecule orientation treatment for facilitating the molecule orientation of liquid crystal 5.

The interdigital electrodes $L_3$ and $L_4$ and opposite electrode $L_1$ are formed of transparent conductive material, such as tin oxide or indium oxide or the like and subjected to the conventional thin film coating and etching process.

Figure 5:
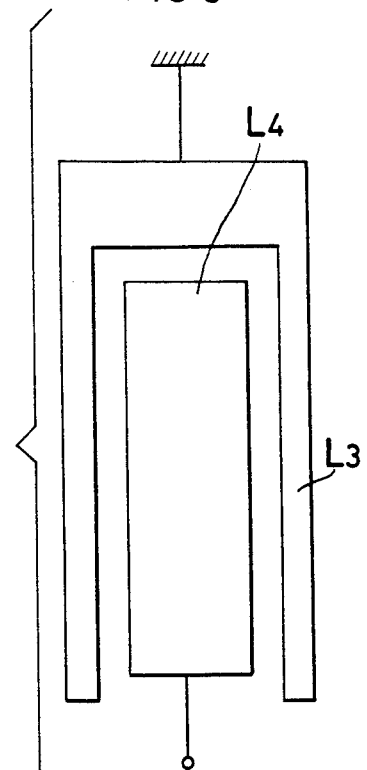

The interdigital electrodes, as shown in FIG. 5, comprise a recessed electrode $L_3$ and an electrode $L_4$ inserted therein, the recessed electrode $L_3$ being grounded as a common electrode, the electrode $L_4$ being switched by a switch S to be connected to an external power source (not shown) or to a ground terminal as the drive electrode or grounded electrode, and having a width of the same dimension as that of one dot forming the ON and OFF conditions of the transmission light.

The opposite electrode $L_1$ serving as a control electrode is connected to the external power source (not shown).

The interdigital electrodes $L_3$ and $L_4$, when the electrode $L_4$ is connected to the earth terminal switched by the switch S, are all grounded so that control voltage Vc is applied between the interdigital electrodes $L_3$ and $L_4$ and the opposite electrode $L_1$, whereby the liquid crystal 5 is forcibly vertically oriented with respect to the substrates 2 and 3 at the liquid crystal cell 1. When the electrode $L_4$ is connected to the drive power source, the drive voltage Vd is applied between the electrodes $L_3$ and $L_4$ and the control voltage Vc between the opposite electrode $L_1$ and the interdigital electrode $L_3$, whereby the liquid crystal 5 is oriented in the direction of the composite electric field of both the voltages, in other words, slantwise with respect to the substrates 2 and 3 at the liquid crystal cell 1.

In addition, the number of pectinations of interdigital electrodes $L_3$ and $L_4$ is not defined to three as in FIG. 3, but may be desirably variable corresponding to the size of liquid crystal cell 1.

The polarizers Po and An are disposed in front of and behind the liquid crystal cell 1, in other words, at the light incident side and transmitting side, respectively, and the polarization axes of the same intersect perpendicularly to each other. Alternatively, the polarizer An, instead of that Po, may be disposed at its polarization axis in parallel to the interdigital electrodes at the liquid crystal 1.

Thus, in the liquid crystal device of the invention, in a case where a miniature lamp (not shown) having a luminous element of tungsten as the light source is disposed in front of the polarizer Po and the control voltage Vc is applied between the opposite electrode $L_1$ and the interdigital electrodes $L_3$ and $L_4$, the molecules of liquid crystal 5 orient vertically (in the direction of the axis Z in FIG. 4-(B)) with respect to the substrates 2 and 3 so that the light polarized in the direction of the axis Y at the polarizer Po of polarization axis in the direction of Y is not absorbed by the liquid crystal 5, but passed directly through the liquid crystal 1, the transmitted light being absorbed completely by the polarizer An to thereby be intercepted, thus forming the OFF condition.

Incidentally, at this time, even when the liquid crystal positioned at the lateral side of electrode is oriented in the direction of the axis X because of the predetermined thickness of each electrode at the liquid crystal cell 1, since the orientation is perpendicular to the polarization axis (in the direction of Y axis) of polarizer Po, the light in the axis Y, passing the polarizer Po, is absorbed completely by the liquid crystal at the lateral side of electrode (the liquid crystal oriented in the direction of the axis X), thereby not passing the liquid crystal cell 1. Hence, a complete OFF condition of the transmission light is formed also at the lateral side of liquid crystal cell 1.

Figure 4B:
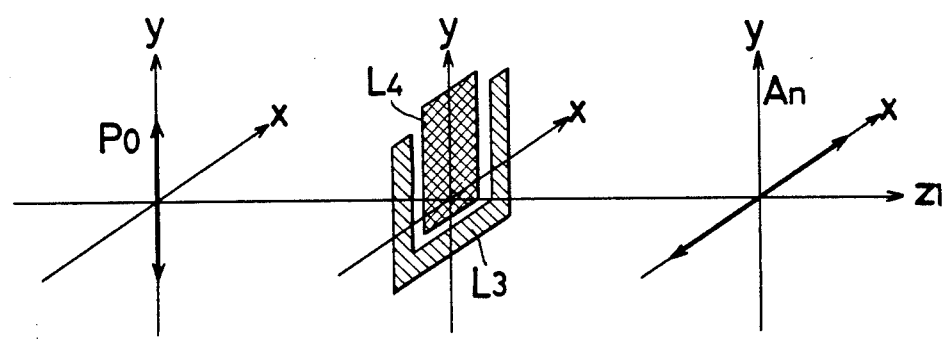

In a case applying the drive voltage Vd between the interdigital electrodes $L_3$ and $L_4$ and simultaneously the control voltage Vc between the opposite electrode $L_1$ and the interdigital electrode $L_3$, the molecules of liquid crystal 5 is oriented slantwise (in the direction of composite axis of the axes Z and X in FIG. 4(B)) with respect to the substrates at the liquid crystal 1 so that the light polarized in the direction of the axis Y at the polarizer Po having the polarization axis in the direction of the axis Y, is optical-rotated in part by the liquid crystal 5 and passes the liquid crystal cell 1, and then passes directly the polarizer An having the polarization axis in the direction of X axis, thereby forming the ON condition of the transmission light.

Incidentally, at this time, even if the liquid crystal between the electrodes $L_1$ and $L_3$ is oriented in the direction of forming the OFF condition of the transmission light because of a greater action of the electric field between the electrodes $L_1$ and $L_3$, the interdigital electrode $L_3$, which is positioned at the outer peripheral portion of one dot forming the ON and OFF condition of the transmission light, can make the transmission light extremely intensive without hindrance to transmission of the light.

Hence, the complete ON and OFF conditions of the transmission light are defined.

In the liquid crystal device of the invention, in the case where the liquid crystal device having a gap of 15 to 25 μm between the pectinations of grounded electrode $L_3$ at the interdigital electrodes, a width of 10 to 20 μm of drive electrode $L_4$, a width of 15 to 25 μm of opposite electrode $L_1$, and a portion of extremely small area of 150 to 500 μm² to form the ON and OFF conditions of the transmission light, is used for the optoelectronic shutter at the scanner for printer, the printer image of an extremely high fidelity with respect to a desired image is obtainable.

Next, explanation will be given on the operating effect of the esecond embodiment of the liquid crystal device of the invention on the basis of the following examples.

In the respective following examples, the liquid crystal cell and polarizers have been disposed as shown in FIG. 4, the interdigital electrodes have been shaped as shown in FIG. 5, a He-Ne laser ($\lambda = 6328$ Å) has been used as the light source, and drive voltage Vd and control voltage Vc have been applied to each liquid crystal cell, thereby having measured the response speed (the rise time and fall time) and a contrast ratio in the ON and OFF conditions of the transmission light.

In addition, the rise time (τ write), fall time (τ erase) and contrast ratio are prescribed by the following equations:

$$\tau \text{ write} = \tau \text{ delay} + \tau \text{ rise, and}$$

$$\tau \text{ erase} = \tau \text{ decay,}$$

where
τ delay: the rise time for raising the intensity of the transmitted light from the maximum value to 10% of the minimum value of the intensity.
τ rise: a time period for the intensity of the transmitted light rising from 10 to 90% of the maximum value, and τ decay: a time period for the intensity of the transmitted light which falls from 90 to 10% of the maximum value.

Contrast ratio = (T max./T min.)

where
T max.: the maximum value of the intensity of the transmitted light, and
T min.: the minimum value of the same.

[Example 1]

In this example, the liquid crystal cell and polarizers have been composed of the following components and the control voltage Vc of 60 V (r.m.s.) and drive voltage Vd of 60 V (r.m.s.) have been applied, thereby having measured the response speed and contrast ratio.
Liquid crystal cell comprising
　liquid crystal in use: ZLI-1557 (manufactured by Merck & Co., Inc.),
　transparent substrate: glass substrate,
　electrode material: indium oxide, and
　a gap between the transparent substrates (thickness of liquid crystal layer): 6.0 μm
Polarizer comprising
　HN-38 (manufactured by Polaroid Corp.)

(Results of Measurement)

Response speed:
　rise time (τ write) = 0.2 msec, and
　fall time (τ decay) = 0.15 msec
Contrast ratio:

(T max./T min.) = 620

[Example 2]

The liquid crystal cell in Example 1 has been used and control voltage Vc of 30 V (r.m.s.) and drive voltage Vd of 30 V (r.m.s.) have been applied, thereby having measured the response speed and contrast ratio.

(Results of Measurement)

Response speed:
　rise time (τ write) = 0.9 msec, and
　fall time (τ erase) = 0.25 msec
Contrast ratio:

(T max./T min.) = 140

[COMPARATIVE EXAMPLE]

The liquid crystal cell in Example 1 has been constructed as shown in FIG. 1 and the control voltage Vc of 35 V (r.m.s.) and drive voltage Vd of 35 V (r.m.s.) have been applied, thereby having measured the response speed and contrast ratio.

(Results of Measurement)

Response speed:
　rise time (τ write) = 0.5 msec
　fall time (τ decay) = 0.6 msec
Contrast ratio:

(T max./T min.) = 125

As seen from the results of measurement in the aforesaid examples, the second embodiment of the liquid crystal device of the invention is so constructed that the liquid crystal cell is disposed between two polarizers whose polarization axes intersect perpendicularly to each other, so that the interdigital electrodes become parallel to either one of two polarizers, and the interdigital electrodes comprise the grounded electrode having a plurality of pectinations and the drive electrode which is positioned between the pectinations and has a width the same as one dot forming the ON and OFF conditions of the transmission light, whereby the contrast ratio in the ON and OFF conditions of the transmission light is remarkably improved and the response speed is extremely fast.

Next, explanation will be given on a third embodiment of the liquid crystal device of the invention on a basis of FIGS. 6-(A) and -(B) and 7.

In addition, the same components as in FIGS. 1 and 2 are designated by the same reference numerals.

Figure 6A:
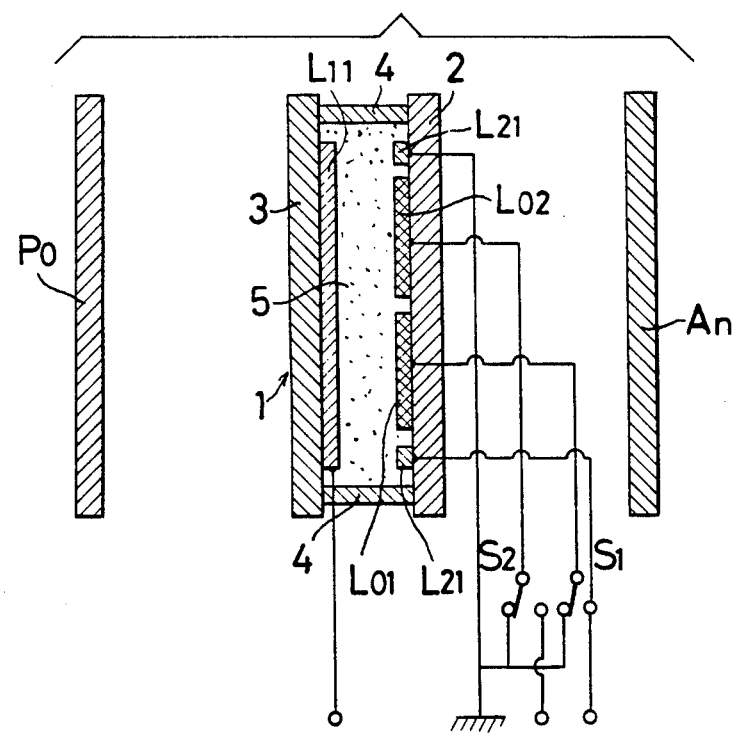
Figure 6B:
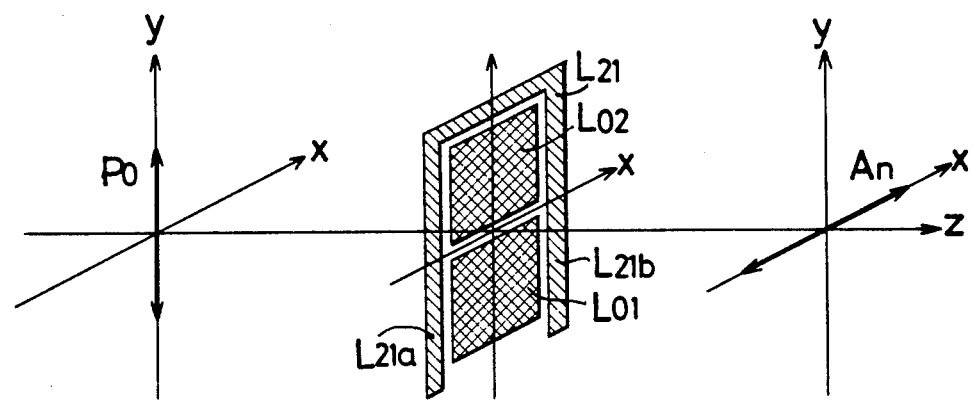

FIGS. 6-(A) and -(B) show the basic construction of the third embodiment, in which reference numeral 1 designates a liquid crystal cell, and Po and An designate polarizers.

The liquid crystal cell 1 comprises a transparent substrate 2 having at the inner surface a recessed grounding electrode $L_{21}$ and drive electrodes $L_{01}$ and $L_{02}$ juxtaposed in the electrode $L_{21}$ and a transparent substrate 3 having at the inner surface an opposite electrode $L_{11}$, both the substrates being disposed close to each other to form the predetermined gap through spacers 4, the gap charging therein liquid crystal 5 exhibiting the positive anisotropy.

The inner surfaces of transparent substrates 2 and 3 are subjected to the molecule orientation treatment for facilitating the molecule orientation of liquid crystal 5.

The grounded electrode $L_{21}$, drive electrodes $L_{01}$ and $L_{02}$, and opposite electrode $L_{11}$, are formed of transparent conductive material, such as tin oxide or indium oxide and subjected to the conventional thin film coating and etching process.

Figure 7:
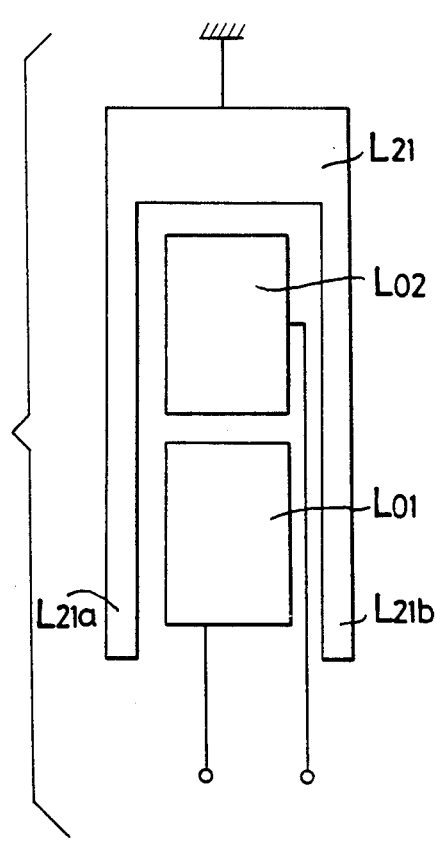

The grounded electrode $L_{21}$, as shown in FIG. 7, is recessed and has two pectinations $L_{21}a$ and $L_{21}b$, between which the two drive electrodes $L_{01}$ and $L_{02}$ each having a width the same as one dot forming the ON and OFF conditions of the transmission light, are juxtaposed, the recessed electrode $L_{21}$ being grounded as the common electrode, the drive electrodes $L_{01}$ and $L_{02}$ being switched by switches $S_1$ and $S_2$ to be connected to an external power source (not shown) or to an earth terminal.

The opposite electrode $L_{11}$ serves as the control electrode and is connected to the external power source (not shown).

Now, the drive electrode $L_{01}$ and grounding electrode $L_{21}$, when the drive electrode $L_{01}$ is grounded by the switch $S_1$, are all grounded so that control voltage Vc is applied between the drive and grounded electrodes $L_{01}$ and $L_{21}$ and the opposite electrode $L_{11}$, whereby the liquid crystal 5 between the drive electrode $L_{01}$ and the opposite electrode $L_{11}$ is forced to orient vertically with respect to the substrates 2 and 3 at the liquid crystal cell 1. Furthermore, when the drive electrode $L_{01}$ is connected to the drive power source, the drive voltage Vd is applied between the drive electrode $L_{01}$ and the grounding electrode $L_{21}$, and the control voltage Vc between the opposite electrode $L_{11}$ and the grounding electrode $L_{21}$, whereby the liquid crystal 5 between the drive electrode $L_{01}$ and the opposite electrode $L_{11}$ is oriented in the direction of the composite electric field of both the voltages Vc and Vd, in other words, slantwise with respect to the substrates 2 and 3 at the liquid crystal cell 1.

When the drive electrode $L_{02}$, simultaneously, is switched to the ground terminal or drive power source by the switch $S_2$, the liquid crystal 5 between the drive electrode $L_{02}$ and the opposite electrode $L_{11}$, as the same as in the drive electrode $L_{01}$, is forcibly oriented vertically or slantwise with respect to the substrates 2 and 3 at the liquid crystal cell 1.

In addition, the pectinations at the grounded electrode $L_{21}$ is not defined to two as shown in FIG. 7, but may be desirably varied in the number of pectinations corresponding to the size of liquid crystal cell 1. Also, the number of drive electrodes $L_{01}$ and $L_{02}$ is not defined to two, but may be two or more corresponding to the scanning speed of an input signal or the like.

The polarizers Po and An are disposed in front of and behind the liquid crystal cell 1, in other words, at the light incident side and emitting side and intersect at the polarization axes perpendicularly to each other. Alternatively, the polarizer An, instead of that Po, may be disposed so that the polarization axis of An is parallel to the drive electrode and grounded electrode at the liquid crystal cell 1.

Thus, in the liquid crystal device of the invention, in the case where a miniature lamp (not shown) having a luminous element of tungsten as the light source is disposed in front of the polarizer Po and the liquid crystal device is given an input signal, the drive electrodes $L_{01}$ and $L_{02}$ are connected to the ground terminal or the drive power source corresponding to a first scan input signal and a second scan input signal respectively, at which time the drive electrode $L_{01}$ or $L_{02}$, when connected to the ground terminal, is grounded together with the grounded electrode $L_{21}$, thereby applying the control voltage Vc between the electrode $L_{01}$ or $L_{02}$ and the opposite voltage $L_{11}$, whereby the liquid crystal 5 existing therebetween orient at the molecules vertically (in the direction of the axis Z in FIG. 6-(B)) with respect to the substrates at the liquid crystal cell 1 so that the light polarized in the direction of the axis Y at the polarizer Po having the polarization axis in the direction of the axis Y is not absorbed by the liquid crystal 5, but passes directly through the liquid crystal cell 1, the transmitted light being absorbed completely by the polarizer An having the polarization axis in the direction of the axis X to thereby be intercepted, thus forming the OFF condition of the transmission light.

At this time, even if the liquid crystal positioned at the lateral side of electrode is oriented in the direction of the axis X because of the predetermined thickness of each electrode at the liquid crystal cell 1, since the orientation is perpendicular to the polarization axis (in the direction of the axis Y) of polarizer Po, the transmitted light in the direction of the axis Y and through the polarizer Po is absorbed completely by the liquid crystal (oriented in the direction of the axis X) at the electrode's lateral side and does not at all pass the liquid crystal cell 1. Hence, the liquid crystal device forms the complete OFF condition of the transmission light also at the lateral side of each electrode at the liquid crystal cell 1.

While, in a case of connecting the drive electrode $L_{01}$ or $L_{02}$ to the drive power source, the drive voltage Vd is applied between the drive electrode $L_{01}$ or $L_{02}$ and the grounded electrode $L_{21}$, and the control voltage Vd simultaneously between the opposite electrode $L_{11}$ and the grounded electrode $L_{21}$, so that the liquid crystal 5 between the drive electrode $L_{01}$ or $L_{02}$ and the opposite electrode $L_{11}$, orients slantwise (in the direction of the composite axis of axes Z and X in FIG. 6-(B)) with respect to the substrate at the liquid crystal cell 1. Hence, the light polarized in the direction of the axis Y at the polarizer Po having the polarization axis in the direction of the axis Y is optical-rotated to pass the liquid crystal 1, the transmitted light passing directly the polarizer An having the polarization axis in the direction of the axis X, thereby forming the ON condition of the transmission light.

Incidentally, at this time, even if the liquid crystal between the opposite electrodes $L_{11}$ and $L_{21}$ orients in the direction of forming the OFF condition of the transmission light because of greater operation of the electric field between the same, the grounded electrode $L_{21}$ positioned at the outer periphery of one dot forming the ON and OFF conditions of the transmission light does not hinder transmission of the light, thereby enabling transmission of the extremely intensive light.

Hence, one liquid crystal device can simultaneously form therein the ON and OFF conditions of two transmission lights corresponding to two scanning input signals, thereby substantially improving two times the response speed of the liquid crystal device, so that even when the scanning input signal is applied at high speed to the device, the complete ON and OFF conditions of the transmission light corresponding to the applied input signals can be formed, whereby the liquid crystal device sufficiently demonstrates the function as the optoelectronic shutter.

Thus, the third embodiment of the invention disposes the liquid crystal cell between two polarizers having the polarization axes intersecting perpendicularly to each other so that the grounded electrode and drive electrodes at the cell become parallel to either one of two polarizers, and a plurality of drive electrodes are juxtaposed, thereby making it possible to obtain the liquid crystal device which can respond at extremely high speed and form the ON and OFF conditions of the transmission light with respect even to the input given at extremely high speed in comparison with the conventional one.

As seen from the above embodiments and results of measurement of examples and comparative examples, the liquid crystal device, in which the liquid crystal cell is disposed between two polarizers whose polarization axes intersect perpendicularly to each other, so that the interdigital electrodes become parallel to one polarizer, thereby being remarkably improved in the contrast ratio of the ON and OFF conditions of the transmission light and enabling the response at extremely high speed in comparison with the conventional one.

Also, as seen from the second embodiment, the interdigital electrodes at the liquid crystal cell comprise the grounded electrode having a plurality of pectinations and the drive electrodes positioned between the pectinations and having a width the same as one dot to form the ON and OFF conditions of the transmission light, thereby further improving the contrast ratio of the ON and OFF conditions of the transmission light.

Furthermore, as seen from the third embodiment, the grounded electrode and drive electrodes at the liquid crystal cell are disposed to be parallel to one of two polarizers and a plurality of drive electrodes are juxtaposed, thereby obtaining the liquid crystal device capable of responding at extremely high speed and of forming the ON and OFF conditions for the transmission light with respect even to the input given at extremely high speed.

As many apparently widely different embodiments of this invention may be made without departing from the spirit and scope thereof, it is to be understood that the invention is not limited to the specific embodiments thereof except as defined in the appended claims.

What is claimed is:

1. A liquid crystal device comprising:
   two substantially parallel polarizers, each having an axis of polarization, wherein the axis of polarization of each polarizer is disposed perpendicularly to the axis of polarization of the other polarizer;
   first and second transparent planar substrates disposed between the polarizers, each substrate having an inner surface, wherein both substrates are positioned parallel to the polarizers and wherein the inner surface of the first transparent substrate opposes in close proximity the inner surface of the second transparent substrate;
   a substantially planar first electrode positioned flat against the inner surface of the first substrate;
   a substantially planar second electrode having at least two pectinations and positioned flat against the inner surface of the second substrate, wherein the pectinations are disposed parallel to the polarization axis of either one of the two polarizers;
   a substantially planar third electrode having at least one pectination and positioned flat against the inner surface of the second substrate, wherein at least one pectination of this electrode is disposed between the pectinations of the second electrode, and wherein the pectinations of the third electrode have a width the same as that of one dot forming an ON and OFF condition of the transmission light; and
   liquid crystal charged between the transparent substrates.

2. A liquid crystal device comprising:
   two substantially parallel polarizers, each having an axis of polarization, wherein the axis of polarization of each polarizer is disposed perpendicularly to the axis of polarization of the other polarizer;
   first and second transparent planar substrates disposed between the polarizers, each substrate having an inner surface, wherein both substrates are positioned parallel to the polarizers and wherein the inner surface of the first transparent substrate opposes in close proximity the inner surface of the second transparent substrate;
   a substantially planar first electrode positioned flat against the inner surface of the first substrate;
   a substantially planar second electrode having at least two pectinations and positioned flat against the inner surface of the second substrate, wherein the pectinations are disposed parallel to the polarization axis of either one of the two polarizers;
   a substantially planar third electrode having at least one pectination and positioned flat against the inner surface of the second substrate, wherein at least one pectination of this electrode is disposed between the pectinations of the second electrode, and wherein the pectinations of the third electrode have a width the same as that of one dot forming an ON and OFF condition of the transmission light;
   liquid crystal charged between the transparent substrates; and
   wherein the liquid crystal device serves as an optoelectronic shutter.

3. A liquid crystal device comprising:
   two substantially parallel polarizers, each having an axis of polarization, wherein the axis of polarization of each polarizer is disposed perpendicularly to the axis of polarization of the other polarizer;
   a first and a second transparent planar substrates disposed between the polarizers, each substrate having an inner surface, wherein both substrates are positioned parallel to the polarizers and wherein the inner surface of the first transparent substrate opposes in close proximity the inner surface of the second transparent substrate;
   a substantially planar first electrode positioned flat against the inner surface of the first substrate;
   a substantially planar second electrode having at least two pectinations and positioned flat against the inner surface of the second substrate, wherein the pectinations are disposed parallel to the polarization axis of either one of the two polarizers;
   a substantially planar third electrode having at least one pectination and positioned flat against the inner surface of the second substrate, wherein at least one pectination of this electrode is disposed between the pectinations of the second electrode; and
   liquid crystal charged between the transparent substrates.

4. A liquid crystal device as in claim 3, wherein the second electrode is electrically grounded and the third electrode is switchable between ground potential and a drive voltage.

5. A liquid crystal device as in claim 3, wherein the third electrode is electrically grounded and the second electrode is switchable between ground potential and a drive voltage.

6. A liquid crystal device comprising:
   two substantially parallel polarizers, each having an axis of polarization, wherein the axis of polarization of each polarizer is disposed perpendicularly to the axis of polarization of the other polarizer;
   first and second transparent planar substrates disposed between the polarizers, each substrate having an inner surface, wherein both substrates are positioned parallel to the polarizers and wherein the inner surface of the first transparent substrates opposes in close proximity the inner surface of the second transparent substrate;
   a substantially planar first electrode positioned flat against the inner surface of the first substrate;
   a substantially planar second electrode having at least two pectinations and positioned flat against the inner surface of the second substrate, wherein the pectinations are disposed parallel to the polarization axis of either one of the two polarizers;
   a substantially planar third electrode having at least one pectination and positioned flat against the inner surface of the second substrate, wherein at least one pectination of this electrode is disposed between the pectinations of the second electrode and wherein the pectinations of the second electrode are separated by 15 $\mu$m to 25 $\mu$m and the pectinations of the third electrode are 10 $\mu$m to 20 $\mu$m wide; and
   liquid crystal charged between the transparent substrates.

7. A liquid crystal device comprising:

two substantially parallel polarizers, each having an axis of polarization, wherein the axis of polarization of each polarizer is disposed perpendicularly to the axis of polarization of the other polarizer;

first and second transparent planar substrates disposed between the polarizers, each substrate having an inner surface, wherein both substrates are positioned parallel to the polarizers and wherein the inner surface of the first transparent substrate opposes in close proximity the inner surface of the second transparent substrate;

a substantially planar first electrode positioned flat against the inner surface of the first substrate;

a substantially planar, substantially U-shaped second electrode having two pectinations and positioned flat against the inner surface of the second substrate, wherein the pectinations are disposed parallel to the polarization axis of either one of the two polarizers;

a substantially planar third electrode positioned flat against the inner surface of the second substrate, wherein this electrode is a single elongated member disposed within the recess formed between the pectinations of the U-shaped second electrode; and liquid crystal charged between the transparent substrates.

8. A liquid crystal device comprising:

two substantially parallel polarizers, each having an axis of polarization, wherein the axis of polarization of each polarizer is disposed perpendicularly to the axis of polarization of the other polarizer;

first and second transparent planar substrates disposed between the polarizers, each substrate having an inner surface, wherein both substrates are positioned parallel to the polarizers and wherein the inner surface of the first transparent substrate opposes in close proximity the inner surface of the second transparent substrate;

a substantially planar first electrode positioned flat against the inner surface of the first substrate;

a substantially planar, substantially U-shaped second electrode having two pectinations and positioned flat against the inner surface of the second substrate, wherein the pectinations are disposed parallel to the polarization axis of either one of the two polarizers;

a substantially planar third electrode having a plurality of pectinations and positioned flat against the inner surface of the second substrate, wherein at least two pectinations of this electrode are disposed within the recess formed between the pectinations of the U-shaped second electrode; and liquid crystal charged between the transparent substrates.

* * * * *